ously dispersed in the aqueous medium, but rather, that at least some flocculation is initially present and, unexpectedly, the charge established on the solid during the initial stage of the process of the invention is found to effect deflocculation thereof during the in situ polymerization stage. This combined effect of establishing charge on dispersed solid and subsequent in situ polymerization and deflocculation during such polymerization is essential to the process to achieve the desired encapsulation of individual particles of solid.

3,714,102
POLYMER ENCAPSULATION OF FINELY DIVIDED SOLIDS
Walter B. Reiss, Shawinigan South, Quebec, Canada, assignor to Gulf Oil Canada Limited, Toronto, Ontario, Canada
No Drawing. Filed Dec. 2, 1970, Ser. No. 94,571
Int. Cl. C08f 45/24
U.S. Cl. 260—29.6 R                                                13 Claims

ABSTRACT OF THE DISCLOSURE
A process is disclosed for the encapsulation of a finely divided inorganic solid, dispersed in aqueous medium, with polymer by in situ polymerization. The process depends on establishing a cationic charge on the dispersed solid followed by polymerization, under specified conditions, of monomer in the aqueous medium in the presence of the solid. If desired, emulsified polymer can be formed in the aqueous medium after encapsulation of the finely divided solid has been completed.

---

This invention relates to deposition of polymer on the surfaces of a finely divided inorganic solid material dispersed in an aqueous medium. More particularly it relates to polymer encapsulation of a finely divided inorganic solid material dispersed in aqueous medium, by in situ polymerization of vinylidene monomer. Throughout this specification the term "vinylidene monomer" is to be taken as including vinyl monomer.

In the manufacture of paints, titanium dioxide and zinc oxide pigments are generally used in at least some proportion of the solid ingredients because of the excellent hiding characteristics thereby imparted to the paint film. However, these opacifying pigments are expensive compared to the other paint ingredients and thus, desirably, should be used to maximum efficiency. These pigments, although tending to flocculate heavily, can be properly dispersed by various known methods in a paint formulation. However, when a wet film of the paint dries, the pigments again tend to flocculate and separate from the film forming components. This, of course, has an adverse effect, particularly on hiding power and on reproducability of color when tinter pigments are used in conjunction with the opacifying pigments. Also, as the pigment volume concentration of the paint is increased, cohesive strength of the paint film is reduced due to the imperfect bonding of pigment and binder. These problems can be overcome to a large extent by encapsulation of the opacifying pigment particles with a layer of polymer binder adhering firmly thereto. On drying the paint films, pigment then remains properly dispersed in the film forming components and film strength is increased. For water based paints, pigment encapsulation in aqueous medium is highly desirable as the polymer coated pigment dispersion can be used directly in the paint formulation and can be incorporated therein without the use of deflocculants or heavy pigment grinding machines. In many paint formulations extenders of various kinds are also used, but for economic reasons it is not usually desirable to utilize extenders encapsulated with polymer binder.

In paper coating formulations, polymer coated pigments and clays are useful for reasons similar to those relating to paints and in this context also preparation of the polymer coated filler in aqueous medium for direct use of the resulting dispersion is desirable. In other applications such as adhesives it is possible that, with an efficient encapsulation technqiue, a latex of polymer particles containing a cheap "core" material could be used to economic advantage.

Thus, polymer coated pigments and clays have a variety of applications provided an efficient and economical technique is available for the preparation thereof. It is becoming increasingly important in any process that organic solvents be replaced by water wherever possible because of cost of solvent, necessity of solvent recovery, and the possibility of air pollution.

It is evident that the most beneficial results are to be obtained in the use of such polymer coated materials when the polymer adheres strongly and encapsulates individual particles of material rather than agglomerates thereof. Further, when film-forming compositions are required, optimum properties are attained when a relatively small amount of polymer binder is present as an encapsulating layer on the particles, the remainder of the polymer binder being present as emulsified polymer separate from the encapsulated material. Thus, an encapsulation technique which is readily regulated is highly advantageous.

In the art various methods have been proposed for coating of finely divided solid materials with a variety of polymers. Some of these methods involve encapsulation of solids with polymer in a medium which is largely organic in nature. Others, for example as disclosed in Canadian Pats. 714,113, 740,823 and 829,843 and U.S. Pat. 3,068,185, involve coating solid particles with polymer by in situ polymerization in aqueous media.

The encapsulation process according to the present invention is characterized by the following advantages:
(1) It is carried out in aqueous medium,
(2) It involves in situ polymerization, thereby promoting improved bonding between polymer and material on which the polymer is formed,
(3) It can readily be applied to a variety of pigments, clays and similar materials,
(4) A variety of monomers can be used in the process,
(5) The process is efficient in that virtually all the formed polymer is deposited on the inorganic solid within the range of monomer to inorganic solid ratios employed; however, after the desired coating is achieved the polymerization conditions can readily be altered to form such amount of emulsified particulate polymer in the dispersion as might be desired for any purpose, e.g. film formation,
(6) A condition essential to the process of the present invention also makes possible highly efficient deflocculation of solids, which is necessary to achieve coating of individual particles of the finely divided material, and
(7) A minimum of operational stages is involved in the process.

The invention thus consists of a process for encapsulation by deposition of polymer on particles of a finely divided inorganic solid material dispersed in an aqueous medium which comprises:
(a) Establishing a cationic charge on the inorganic solid material dispersed in the aqueous medium,
(b) Adding to the aqueous medium vinylidene monomer which is polymerizable to form water-insoluble polymer and polymerizing said monomer in the presence of the dispersed inorganic solid with agitation and the aid of a free radical producing polymerization initiator, the weight ratio of total monomer to dispersed solid being not greater than about 2.5 to 1 and the proportion of any emulsifying agent for said monomer being insufficient to cause formation during polymerization of emulsified polymer particles separate from the dispersed solid.

The process according to the present invention can be applied to numerous finely divided inorganic solid materials dispersed in water, for example various coated and uncoated rutile and anatase titanium dioxide pigments, zinc oxide pigments, alumina, talc, and various clays. These inorganic materials, for the purposes of the present process, should of course not interfere in any way with the polymerization reaction to be carried out in the aqueous medium in which they are dispersed.

Many of the aforementioned materials dispersed in pure water carry at least a slight anionic surface charge. In the present process, formation of substantially all of the polymer on the surfaces of the dispersed inorganic solid depends on the presence of a cationic charge thereon. The means of establishing the cationic charge will depend on the inorganic solid and monomer to be used and also on the required degree of deflocculation of the solid. With pigments and clays, efficient deflocculation is usually desirable although for some end uses polymer encapsulation of agglomerates would not be disadvantageous. In the method of the present invention, establishment of a high cationic charge density on the surfaces of the inorganic solid provides efficient deflocculation as well as the conditions for efficient polymer deposition. Thus a principal requirement of the inorganic solid for the purposes of the present process is that its surface anionic charge be reversible to cationic; a secondary requirement is that a high cationic charge density be possible when required. Various means of charge reversal are known per se in the art relating to colloid chemistry and can be utilized as the first step in the instant process. For example, lowering the pH of the aqueous medium in which the solid is dispersed may effect charge reversal from anionic to cationic. If this expedient is insufficient, adsorption of multivalent inorganic cations and/or of cationic organic compounds should cause reversal at acid pH. In other cases organic materials which are cationic at alkaline pH may be added to pigment or clay in aqueous medium without acidifying the aqueous medium to achieve charge reversal on the solid.

The surface charge on some pigments and clays can be reversed merely by lowering the pH of the aqueous medium by addition of, for example, an acid. However, if the pH is too low it may be unsuitable for polymerization of many monomers, for example vinyl acetate, and the charge density obtained thereby may be insufficient for substantially complete deflocculation. Therefore adsorption of suitable multivalent inorganic cations may be used at acid pH to attain high cationic charge density. Examples of suitable multivalent inorganic cations are those known in the colloid art for the purpose of charge reversal, e.g. $Al^{+3}$, $Zn^{+2}$, $Th^{+4}$, $UO_2^{++}$, $Pd^{+2}$. However, aluminum salts are preferred as aluminum forms a small ion of high charge and salts thereof are relatively cheap. Certain commercial pigments may, however, already contain small proportions of, for example, alumina, or consist entirely of aluminum compounds or zinc oxide and with these, charge reversal and high charge density may readily be obtained merely by lowering the pH of the aqueous medium by addition of acid. When multivalent metal salts are added for the purposes of charge reversal to a high cationic charge density, it is of course possible to use a suitable salt in amounts which will lower the pH of the medium to the desired value without the specific addition of an acid. But, the amount of charge reversing compound should not be so high as to cause "salting out" effects during the polymerization of monomer in the aqueous medium. Thus it is often beneficial for this and other reasons as well, when dealing with systems involving pigments or clays, to use a combination of a weak acid and a multivalent cation salt.

Additionally, the amount of for example aluminum salt used can be reduced by or supplemented with an organic compound which is cationic at the particular pH of the medium. Any such organic compound can be used for the purposes of charge reversal provided that it does not interfere with the subsequent polymerization step. Charge reversal and efficient deflocculation also can be achieved with certain pigments and clays by adsorption of an organic compound without the use of multivalent inorganic cation or necessarily pH adjustment. As organic compounds which are cationic when used at the proper pH, it is preferred to use polyelectrolytes, i.e. polymeric materials having a high proportion of cationic groups, although non-polymeric cationic compounds may also be used. Examples of suitable polyelectrolytes are protein colloids, lecithin, cationic guar gum, and certain synthetic polymers of e.g. t.-butyl aminoethyl methacrylate, 2-dimethylaminoethyl methacrylate, ethylene imine, vinyl amine, vinyl pyridine and derivatives, used of course at the appropriate pH. The cationic compounds may also have surfactant action, i.e. be cationic surfactants, but they are used for the purposes of the present process in amounts sufficient only to cause charge reversal; any change in the hydrophilicity of the solid surface is incidental. Also, if cationic compounds having surfactant properties are to be used, the amounts thereof must be less than the critical micelle concentration in relation to monomers to be polymerized in the system.

The amounts of inorganic salts and/or organic compounds used for charge reversal need only be sufficient to achieve the desired cationic charge density. The amount of compound required at the particular pH for charge reversal can readily be determined by known means, e.g. electrophoretic methods or streaming current measurements. Also, viscosity of a slurry of the inorganic solid in water, as charge reversal materials are added thereto, is an index of the efficiency of deflocculation as viscosity decreases to a minimum at substantially complete deflocculation.

The polymerization of monomer or monomers for polymer deposition on the inorganic solid is carried out in the aqueous medium in the presence of the dispersed solid. The major proportion of the monomers, in any particular case, is most suitably composed of vinylidene monomers used extensively in the polymer coating art i.e. vinyl esters such as vinyl acetate, acrylate and methacrylate esters, vinyl aromatics such as styrene and substituted styrenes, vinyl chloride, vinylidene chloride, or mixtures thereof. The main characteristic of suitable monomers or mixtures is that they be polymerizable to form substantially water insoluble polymers, even though the monomers themselves may be completely water soluble in the proportions used, for example, vinyl acetate at less than about 2.5% by weight of water. The polymerization may involve copolymerization of monomers such as those already indicated with each other or with other ethylenically unsaturated monomers provided that the proportions are such that water insoluble polymers are formed. If monomers containing electronegative groups, e.g. acrylic acid, are utilized as comonomers, however, the proportions should not be such as would reverse or significantly lower the density of the cationic charge on the dispersed solid before polymerization and polymer deposition can occur. Thus, comonomers having electronegative groups should preferably only be used in small proportions relative to other monomers used. If monomers containing groups which are cationic under the particular pH conditions are utilized as comonomers this may be beneficial in maintaining the electric field strength at the surface of the particles as the polymer coating increases in thickness. Examples of comonomers containing groups which are cationic at acid pH are t-butylaminoethyl methacrylate, and 2-dimethyl aminoethyl methacrylate. Suitable proportions for such cationic comonomers are less than about 5% by weight of total monomers used, in order to preclude any stabilization of polymer particles separate from the dispersed inorganic solid and also because of cost considerations. In many cases proportions of 2% or less, by weight of total monomers, are quite sufficient for the purposes of the present invention.

The present process is applicable over a range of ratios of monomer to inorganic solid with substantially complete deposition of formed polymer on the surfaces of the finely divided inorganic solid. Obviously this does not occur if the amount of monomer is very large in comparison to the amount of inorganic solid when both are dispersed in the aqueous medium and polymerization carried out. Build-up of polymer on the surfaces of the inorganic solid is limited eventually of course by thermodynamic considerations relating to the particular inorganic solid and monomer used. However with many pigments and clays and suitable monomers, substantially no polymer forms other than on the surfaces of the dispersed inorganic solid during the process according to the present invention as long as the ratio of total monomer to inorganic solid is not more than about 2.5 to 1 by weight. Preferred ratios are of the order of 1 or less by weight. The amount of monomer used may be calculated to provide only a monomolecular layer of polymer, or even less, on the dispersed solid, or it may be sufficient even within the foregoing range to form a polymer layer of volume exceeding considerably that of the inorganic solid material. For many uses of pigments and clays, however, a ratio of polymer to inorganic solid of about 0.5:1 to 1:1 by volume is optimum.

The polymerization step of the process according to the present invention is carried out in the aqueous medium, in the presence of the dispersed inorganic solid, with the aid of free radical producing polymerization initiators which are known in the art as suitable for aqueous dispersion polymerization. However, it is preferred to use initiators in amounts that do not form large quantities of anionic residue which may tend to diminish the effect of, or reverse the cationic charge on the surface of the solid. Thus, when monomer is added to the aqueous dispersion of inorganic solid in quantities sufficient to form a separate liquid phase it is preferred to use an oil soluble initiator which forms little anionic residue, for example peroxides (e.g. benzoyl peroxide), peroxydicarbonates, and azo compounds (e.g. $\alpha,\alpha'$-azodiisobutyronitrile). When monomer is used in proportions such that it is completely soluble in the aqueous phase, it is preferred to use a water-soluble initiator such as water-soluble peroxy compounds, persulfates, and peracetates. Redox initiators, although less preferred, may also be used for the purposes of the present process, e.g. a salt of a persulfuric acid, or an organic hydroperoxide or peroxide, in combination with a water-soluble sulfite, bisulfite, hydrosulfite or metal formaldehyde sulfoxylate.

The amounts of polymerization initiator employed will be such as are known in the art of aqueous dispersion polymerization, i.e. of the order of 0.001% to 2% by weight of monomers, dependent on the temperature at which the polymerization is to be carried out and on the nature of the particular initiator.

It may be desirable in some cases, although not critical to the process of the present invention, to employ dispersion stabilizers such as protective colloids. When pigments or clays are encapsulated with polymer, protective colloids may assist in preventing coalescence during the polymerization step. Dispersions of polymer encapsulated pigments and clays tend to settle quite rapidly because of the high specific gravity of the particles. Protective colloids are therefore useful in rendering the polymer encapsulated particles easily re-dispersible. Examples of dispersion stabilizers which may be so used are hydroxyethyl cellulose, hydroxypropyl methyl cellulose, methyl cellulose, ethylene oxide polymers, polyvinyl pyrrolidone, certain vinyl pyrrolidone-vinyl acetate copolymers, and other materials known in the art of aqueous emulsion and suspension polymerization. When used, the amount of dispersion stabilizer is preferably within the range of about 0.5 to 2% by weight of total solids, i.e. inorganic solid plus polymer, although larger amounts may be utilized.

It is however a critical feature of the encapsulation process according to the present invention that efficient emulsifying agents for the monomers to be polymerized must not be present in amounts which promote the formation of polymer separate from the dispersed inorganic solid material. Thus, for ionic surfactants, amounts equal to or greater than the critical micelle concentration must not be used. It should also be remembered that anionic surfactants if used should only be present in amounts which will neither reverse nor significantly lower the density of the cationic charge on the dispersed inorganic solid. For non-ionic surfactants the concentration must be less than that which in conventional emulsion polymerization would enable formation of new polymer particles during polymerization and would be known or readily determined by one skilled in the art. However, once the polymer encapsulation process has been carried out, surfactants may then be added to the aqueous medium with desired amounts of additional monomer and polymerization continued to form a product containing both polymer encapsulated inorganic solid and emulsified polymer particles in any desired ratio. The formation of controlled amounts of emulsified polymer may be particularly beneficial with regard to film-forming properties of the aqueous composition. When emulsifier is utilized in this manner it is added in amounts used in conventional emulsion polymerization techniques, e.g. 0.001% to 5% or more by weight of monomer to be polymerized, depending on the particular emulsifier used.

If it is desired to incorporate plasticizers during the process of the present invention, these are most suitably added when the polymerization step has reached substantial completion.

The polymerization of monomers in the aqueous medium in the presence of the dispersed solid may be carried out by either a "batch" technique or a "delayed addition" technique. Both techniques are well known in the art of emulsion and suspension polymerization. In the present context the batch technique involves addition of total amounts of monomers and other ingredients directly to the aqueous dispersion of solid and polymerization is carried out at the desired temperature and with efficient mechanical agitation. In a delayed addition technique, monomer, initiator and perhaps other ingredients are added over a period of time to the dispersion of inorganic solid as polymerization proceeds. When the amount of monomer used is substantial relative to the amount of dispersed solid and is such that a separate liquid phase is formed, it is preferred to use a delayed addition technique to ensure that no build-up of monomer occurs and that monomer will be well dispersed in the aqueous phase by the mechanical agitation throughout the polymerization. Otherwise monomer may coalesce into large droplets which, as polymerization occurs, tend to form polymer beads separate from the dispersed solid. To preclude excessive build-up of a separate monomer phase, the presence of a material which is a mutual solvent for monomer and water is helpful, even in small proportions, as it increases the miscibility of aqueous and monomer phases. An example of such a mutual solvent is acetic acid, in the case of vinyl acetate and water in proportions at which the vinyl acetate normally forms a separate phase. If the monomer to inorganic solid ratio is relatively low, or if the monomer is dissolved in the aqueous phase, a batch technique of polymerization may be equally suitable. During polymerization, efficient mechanical agitation, as is used in conventional dispersion polymerizations, also prevents dispersed monomer from coalescing.

The invention is illustrated by the following examples which are however not to be taken as limiting to the scope thereof.

EXAMPLE 1

This comparative example shows the effect of establishing a cationic charge on the surface of a material such as a pigment, prior to polymer coating thereof according to the process of the present invention.

(A.) To a 1-litre glass polymerization kettle were added 400 mls of water and 6.0 grams of hydroxyethyl cellulose protective colloid sold as Natrosol 180LR (trademark). The kettle was mounted on a laboratory type Clausing disperser fitted with a Torrance 2¼″ diameter, stainless steel, dual shear, Type P–2 dispersion rotor. Agitation was started and 600 grams of an anatase titanium dioxide pigment, having minimum titanium dioxide content of 98% and average particle size of 0.3μ, sold as Titanox A-WD (trademark) by Canadian Titanium Pigments Ltd., was added gradually to the contents of the kettle. The rotor speed was continuously adjusted throughout the addition of pigment to maintain a deep vortex in the dispersion. Grinding and dispersion of the pigment were assisted by scraping the kettle walls with a spatula and feeding the scraped material into the vortex. After all the pigment had been added, grinding was continued for a period of ten minutes. The kettle, removed from the Clausing disperser, then was set up for polymerization, using the previously described dispersion rotor and additionally a condenser, thermometer, dropping funnel and an inlet and outlet for inert gas. A continuous stream of nitrogen was passed through the kettle and agitation started at a speed sufficient to maintain a slight vortex in the dispersion. The kettle was heated to a temperature of 65° C. Addition, via the dropping funnel, of a solution of 170 grams of vinyl acetate containing 0.7 grams of α,α′-azodiisobutyronitrile was started and maintained at a rate such that monomer did not accumulate in the vortex. When less than 20% of the monomer feed had been added, however, the viscosity of the dispersion increased to such an extent that agitation could not be continued and coagulation occurred.

(B.) Titanox A-WD pigment dispersed in water has a strong negative charge which cannot be reversed merely by lowering the pH with acid, but requires the use of additional means to reverse the charge and obtain a high cationic charge density.

The procedure of Example 1A was repeated. However, to the 400 mls of water originally placed in the kettle were added 6.0 grams of hydroxyethyl cellulose protective colloid sold as Natrosol 250LR (trademark), rather than Natrosol 180LR, and 4.2 grams of aluminum nitrate (Al(NO$_3$)$_3$·9H$_2$O). The pigment was added gradually as previously described. After grinding for 10 minutes, 15 grams of glacial acetic acid was added, and 2.7 grams of a 1% aqueous solution of a protein of isoelectric point 5.7 sold as Colloid 5V (trademark) by Swift & Co. During this procedure the dispersion viscosity decreased to a minimum indicating highly efficient pigment deflocculation. It was indicated by streaming current measurement that the pigment particles in the dispersion had acquired a strong positive charge. Polymerization was carried out as previously described and proceeded smoothly, the rotor speed being varied, however, between about 600 and 1200 r.p.m. due to transient viscosity changes. The monomer feed consisted of 170 grams of vinyl acetate containing 1.7 grams of benzoyl peroxide dissolved therein. When all the monomer had been added, the temperature was gradually raised to about 85° C. to polymerize any residual monomer. The dispersion was cooled to 40° C. and 17 grams of dibutyl phthalate added with further mixing. The dispersion was found to contain 64% total solids by weight and 0.42% residual monomer by weight, and to have a viscosity of 121 poises (Brookfield, spindle No. 5, 20 r.p.m., 28° C.), and a pH of 2.3.

Consideration of the results of microscopic examination of the dispersion using a staining technique and electron micrographs indicated the presence of only a small proportion of spherical polymer particles, indicating that substantially all of the formed polymer was on the surface of the pigment particles and that the encapsulated pigment particles retained the shape of the original pigment particles. The electron micrograph showed the pigment to be well deflocculated. The proportion of monomer to pigment used was 0.28 by weight and the polymer to pigment ratio was calculated to be 0.93 by volume on the basis that all polymer was deposited on the surfaces of the pigment.

EXAMPLE 2

This example illustrates polymer encapsulation of a pigment with prior charge reversal by addition of acid to the aqueous medium, and use of the product dispersion in a paint formulation.

The procedure was as in Example 1A. 600 grams of the pigment, an anatase titanium dioxide pigment of 97% minimum titanium dioxide content containing 0.8–1.2% alumina and having an average particle size of 0.3μ sold as Titanox A–168 (trademark) by Canadian Titanium Pigments Ltd., was dispersed in 350 grams of water containing 3 grams of Natrosol 180 LR hydroxyethyl cellulose. After initial grinding, 6 g. glacial acetic acid was added to the dispersion to lower the pH to 4.5. The dispersed pigment was indicated as having a positive charge by streaming current measurement. Polymerization was carried out as described in Example 1 using a feed solution of 1.5 grams benzoyl peroxide dissolved in 150 grams of vinyl acetate. The product was a dispersion containing 67.6% by weight total solids. The ratio of monomer to pigment used was 0.25 by weight giving a calculated ratio of polymer to pigment of 0.8 by volume. Both microscopic examination using staining and electron micrographs indicated almost no spherical polymer particles, that is, formed polymer had encapsulated the dispersed pigment. Pigment deflocculation was satisfactory as indicated in the electron micrographs although pre-dispersion was not complete. The polymer coated pigment tended to settle out from the aqueous dispersion relatively rapidly but could readily be re-dispersed merely by stirring.

The product dispersion was incorporated in a typical interior latex paint formulation of about 50% pigment volume concentration (PVC) by first dispersing into water in conventional manner extenders and additives such as film coalescing agents, thickener, surfactant, bacteriostat and anti-foam agent, and then blending in encapsulated pigment dispersion. The same ingredients were used to prepare a conventional paint with non-encapsulated pigment. Although the predispersion of the encapsulated pigment was incomplete, the paint formulation in which it was used showed improved brightness and hiding, and lesser depth of hue on addition of universal colorant dispersion, when compared to the conventional paint containing identical proportions of ingredients.

EXAMPLE 3

This example illustrates polymer encapsulation of a rutile titanium dioxide pigment and use of the product dispersion in paint formulations.

The general procedure of Example 1 was repeated using a rutile titanium dioxide pigment of 91.5% titanium dioxide content and average particle size about 0.2μ, sold as Tioxide R–HD4 (trademark) by Tioxide of Canada Ltd. 450 grams of the pigment was dispersed, as previously described, into 300 grams of water containing 4.5 grams of Natrosal 250LR hydroxyethyl cellulose and 0.25 gram of Al(NO$_3$)$_3$·9H$_2$O. After initial grinding, 10 grams glacial acetic acid was added, followed by 2.0 grams of 1% aqueous solution of Colloid 5V protein. Decrease in dispersion viscosity was observed and the dispersed pigment was indicated as having a positive charge. 510 grams of this pigment dispersion, to which was added a further 125 grams of water, was used for the polymerization step. A monomer feed solution of 3.2 grams of benzoyl peroxide dissolved in 322 grams of vinyl acetate was used for the polymerization, which was carried out as described in Example 1. The polymerization proceeded smoothly. After cooling the dispersion, 32.2 grams dibutyl phthalate plasticizer was added with further agitation.

The product contained 66.8% total solids and 0.35% residual monomer by weight of dispersion, had a pH of 4.5, and a viscosity of 18 poise (Brookfield, spindle #4, 20 r.p.m., 26° C.). The monomer to pigment ratio used was 1.08 by weight giving a calculated volume ratio of polymer to pigment of 3.62. Both microscopic examinations using staining and electron micrographs indicated substantially no spherical polymer particles and, thus, efficient pigment encapsulation. The electron micrographs showed excellent predispersion of pigment.

The product dispersion was tested in the following low pigment volume concentration interior latex paint formulation containing titanium dioxide as the only pigment. A conventional paint containing the same proportions of ingredients was also prepared using non-encapsulated pigment and polyvinyl acetate emulsion for purposes of comparison. The formulations were as follows, all amounts being in parts by weight:

|  | A | B |
| --- | --- | --- |
| Encapsulated Tioxide-RHD4 pigment dispersion |  | 990.4 |
| Water | 352.1 | 252.0 |
| Daxad 40 (trademark)—dispersant, sodium salt of a polymerized carboxylic acid as solution of 25%/w in $H_2O$ | 2.4 |  |
| Tioxide R-HD4 pigment | 299.0 |  |
| Ethylene glycol | 28 | 28 |
| Hexylene glycol | 12.8 | 12.8 |
| Igepal CO-630 (trademark)—surfactant, nonylphenoxypoly(ethyleneoxy) ethanol | 1.7 | 1.7 |
| Natrosol 250HR hydroxyethylcellulose | 5.0 | 2.1 |
| Colloid 581B (trademark)—nonionic defoaming agent | 1.3 | 1.3 |
| Super-Ad-It (trademark)—phenylmercury dodecylsulfosuccinate fungicide | 0.7 | 0.7 |
| Emulsion AE-2230 (trademark)—55% solids polyvinyl acetate emulsion | 586.0 |  |
| Total | 1,289.0 | 1,289.0 |

NOTE.—pH adjusted to 8.5 with ammonia.

Paint films prepared from these formulations were submitted to a wet scrub resistance test as a measure of mechanical strength thereof. The test was carried out by first applying to the full length of a 6 by 17 inch glass panel a standard alkyd primer undercoating, tinted green for purposes of visual comparison, to give a dry film thickness of 2.2±0.2 mm. after 24 hours air drying. The paint formulation to be tested was then applied to the undercoated panel to give a dry paint film thickness of 1.8±0.2 mm. Drying was carried out in air at room temperature for a period of 3 days. The panel was then placed in a Gardner Straight Line Washability Machine and scrub resistance determined using a hog bristle brush weighted to 1 lb. and a 0.5% aqueous solution of an oxyethylated phenol non-ionic detergent (Triton X–100, trademark) for wetting. The results are reported as the number of cycles, each cycle consisting of a complete forward and reverse movement, at which ½ inch failure appears in the paint film.

Paint formulation (A) was found to have a wet scrub resistance of 2450 cycles. Paint formulation (B) incorporating encapsulated pigment had a scrub resistance of only 1350 cycles. However, an equal volume blend of (A) and (B) was found to have a wet scrub resistance of much greater than 5000 cycles. Thus in paint formulations the superior properties attributable to polymer encapsulated opacifying pigment are achieved only when a combination of the polymer encapsulated pigment together with additional polymer incorporated as an emulsion thereof is used. As the encapsulated pigment particles appear to retain the irregular shape of the original pigment particles, additional polymer binder is required to achieve most effective film formation. The desired proportion of polymer emulsion can be added to the encapsulated polymer dispersion or prepared in situ after the encapsulation process, as will be illustrated in later examples herein.

EXAMPLE 4

This example illustrates encapsulation of pigment by polymerization of vinyl acetate monomer to give a polymer coating of volume substantially greater than the pigment particle volume.

180 grams of Tioxide R-HD4 pigment, described in Example 3, was dispersed as described in Example 1 in 190 grams of water to which had been added 3.0 grams of Natrosol 180LR hydroxyethyl cellulose, 5.0 grams of Carbowax 4000 (trademark) which is a water soluble polyethylene glycol having a freezing range of 50–55° C. and a Saybolt viscosity of 500–700 sec. at 210° F., and 0.25 gram of $Al(NO_3)_3 \cdot 9H_2O$. After initial grinding of the dispersion, 4.0 grams of glacial acetic acid and subsequently 0.8 gram of 1% Colloid 5V protein solution were added. A decrease in dispersion viscosity was noted and the pigment in the resulting dispersion had a strong positive charge as indicated by streaming current measurement. Polymerization was then carried out as in the process of Example 1 with delayed addition of a solution of 4.2 grams of benzoyl peroxide dissolved in 421 grams of vinyl acetate. In this case, however, simultaneous addition of a solution of 2 grams acetic acid in 100 grams of water via a second dropping funnel was carried out. After polymerization was complete, 42.1 grams of dibutyl phthalate was added with agitation. The product was a dispersion containing 66.5% total solids by weight. The monomer to pigment ratio used was 2.34 by weight giving a calculated polymer to pigment volume ratio of 8:1. Electron micrographs showed excellent predispersion of pigment. The electron micrographs and microscopic examination using staining indicated the absence of emulsified polymer particles. The encapsulated pigment particles corresponded in shape to the original pigment particles.

EXAMPLE 5

This example illustrates the encapsulation of pigment with polyvinyl acetate over a range of polymer to pigment volume ratios and a comparison of the properties of paint formulations incorporating the product dispersions. It also illustrates the use of oil-soluble and water-soluble initiators in the polymerization stage of the process.

(A) The general procedure of Example 1 was repeated using 600 grams of Tioxide R–HD4 pigment dispersed in 400 grams of water containing 6.0 grams Natrosol 250LR hydroxyethyl cellulose and 0.33 gram of

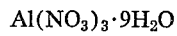
$Al(NO_3)_3 \cdot 9H_2O$

After initial grinding of the dispersion, 15 grams of glacial acetic acid was added, followed by 2.7 grams of 1% Colloid 5V protein solution. The dispersed pigment was indicated as having a strong positive charge by streaming current measurement. Polymerization was carried out as in Example 1 using a feed solution of 1.7 grams of benzoyl peroxide in 170 grams of vinyl acetate. After completion of polymerization and cooling of the dispersion, 17.0 grams of dibutyl phthalate plasticizer was added with agitation. The product dispersion contained 65.5% total solids and 0.35% by weight residual monomer; it had a viscosity of 16 poises (Brookfield, #3 spindle, 20 r.p.m., 20° C.) and a pH of 4.6. Electron micrographs showed excellent predispersion of pigment and, considered in conjunction with microscopic examination using staining, showed no spherical, i.e. emulsified, polymer particles. The monomer to pigment weight ratio was 0.28 giving a calculated polymer to pigment volume ratio of 1.

(B) The procedure of part A was repeated. However, the polymerization was carried out using a feed solution of 0.9 gram benzoyl peroxide in 85 grams vinyl acetate and after polymerization and cooling of the dispersion, 8.5 grams of dibutyl phthalate plasticizer was added with mixing. The product dispersion contained 65.5% total solids by weight, 0.07% residual monomer by weight, and had a pH of 4.6 and viscosity of 7.0 poises (#3 spindle, 20 r.p.m. 20° C.). Electron micrographs and microscopic examination indicated results similar to those of part A. The monomer to pigment weight ratio was 0.14 giving a calculated polymer to pigment volume ratio of 0.5.

(C) The general procedure of Example 1 was repeated again using 600 grams of Tioxide R-HD4 pigment dispersed in 400 grams of water containing 6.0 grams Natrosol 250LR hydroxyethyl cellulose and 0.33 gram $Al(NO_3)_3 \cdot 9H_2O$. After initial grinding of the dispersion, 15 grams of glacial acetic acid was added followed by 2.7 grams of 1% Colloid 5V protein solution. 2.5 grams of a 2% aqueous solution of ammonium persulfate polymerization initiator was added. Polymerization was then carried out as in Example 1 using delayed addition of 10 grams of vinyl acetate monomer. The product dispersion contained 58.8% total solids by weight, 0.21% residual monomer by weight, had a pH of 4.4 and a viscosity of 70 poises (Brookfield, spindle #3, 20 r.p.m., 20° C.). Electron micrographs showed excellent predispersion of pigment and no emulsified polymer particles could be detected. The monomer to pigment ratio used was 0.017 by weight. This proportion of monomer, on the basis of 100% conversion of monomer and complete deposition of polymer on pigment, was calculated to provide a monomolecular layer of polymer on pigment surfaces. Taking into account the residual monomer, however, polymer was estimated actually to cover approximately 80% of the pigment surface.

The polymer encapsulated pigment dispersion were directly tested in a typical paint formulation similar to that set out in Example 3. A paint formulation (No. 1) using non-encapsulated pigment was prepared for comparative purposes. The exact formulations are set out as follows, all amounts being in parts by weight:

|  | Paint Number | | | |
|---|---|---|---|---|
|  | 1 | 2 | 3 | 4 |
| Polyvinyl acetate encapsulated Tioxide R-HD4 pigment dispersion | Control | ¹ 604.3 | ² 557.4 | ³ 518.4 |
| Water | 352.1 | 220.3 | 181.8 | 144.3 |
| Daxad 30 dispersant | 2.4 | | | |
| Tioxide R-HD4 pigment | 299.0 | | | |
| Ethylene glycol | 28.0 | 28.0 | 28.0 | 28.0 |
| Hexylene glycol | 12.8 | 12.8 | 12.8 | 12.8 |
| Igepal CO-630 surfacatnt | 1.7 | 1.7 | 1.7 | 1.7 |
| Natrosol 250HR hydroxyethyl cellulose | 5.0 | 2.0 | 2.0 | 2.0 |
| Colloid 581B defoaming agent | 1.3 | 1.3 | 1.3 | 1.3 |
| Super-Ad-It fungicide | 0.7 | 0.7 | 0.7 | 0.7 |
| Emulsion AE-2230 | 586.0 | 418.2 | 503.7 | 580.1 |
| Total weight | 1,289.0 | 1,289.3 | 1,289.4 | 1,289.3 |

¹ Dispersion A.
² Dispersion B.
³ Dispersion C.

NOTE.—pH adjusted to 8.5 with ammonia.

The following values were obtained for wet scrub resistance of the foregoing paints, determined as described in Example 3: Paint No. 1—2450 cycles, Paint No. 2—13,900 cycles, Paint No. 3—over 16,500 cycles, and Paint No. 4—7000 cycles. It is evident, as illustrated by the above paint formulations, that when even a minimal amount of the polymer binder is present as an encapsulating polymer coating on the pigment particles, mechanical strength of the paint film greatly exceeds that obtained for a paint formulation in which the pigment has been dispersed by conventional means and not encapsulated with polymer.

EXAMPLE 6

This example illustrates encapsulation of a pigment by polymerization of methyl methacrylate monomer.

The procedure described in Example 1 was repeated using 450 grams of Tioxide R–HD4 pigment dispersed in 300 grams of water containing 4.5 grams of Natrosol 180LR hydroxyethyl cellulose, 3.6 grams of Carbowax 4000 polyethylene glycol, and 0.25 gram of

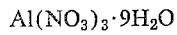
$Al(NO_3)_3 \cdot 9H_2O$

After initial grinding of the dispersion, 10 grams of glacial acetic acid was added and 2.0 grams of 1% Colloid 5V protein solution. The polymerization was carried out as described in Example 1 using 510 grams of the cationically charged pigment dispersion prepared above and 125 grams of water as the initial charge. The delayed feed solution for the polymerization consisted of 3.2 grams of benzoyl peroxide dissolved in 322 grams of methyl methacrylate. The polymerization proceeded smoothly. The product dispersion contained 64.8% total solids by weight, 0.04% residual monomer by weight, and had a pH of 4.4 and a viscosity of 9.0 poises (Brookfield, spindle #4, 20 r.p.m., 26° C.). Electron micrographs showed the pigment predispersion to be excellent and indicated substantially no emulsified polymer particles. The monomer to pigment ratio used was 1.08 by weight.

EXAMPLE 7

The procedure of Example 6 was repeated exactly, except that 322 grams of styrene was used as monomer instead of methyl methacrylate and polymerization was carried out at a higher temperature, i.e. about 90° C. Polymerization proceeded smoothly. The product dispersion contained 64.8% solids and 0.08% residual monomer by weight; it had a pH of 4.4 and a viscosity of 12.0 poises (Brookfield, spindle #4, 20 r.p.m., 22° C.). Electron micrographs showed excellent pigment predispersion and indicated the absence of emulsified polymer particles. In this case also the monomer to pigment ratio was 1.08 by weight.

EXAMPLE 8

This example illustrates polymer encapsulation of a clay by the process according to the present invention.

The procedure described in Example 1 was followed using, instead of titanium dioxide pigment, a water-washed, fractionated aluminosilicate clay having a low electrolyte content sold as Clay SP33 (trademark) by the Freeport Kaolin Co. 183.0 grams of Clay SP33 was dispersed in 400 grams of water containing 3 grams of Natrosol 180LR hydroxyethyl cellulose and 2.4 grams of Carbowax 4000 polyethylene glycol. The pH of the dispersion was adjusted to 7.0 by addition of 0.5 gram of magnesium hydroxide, to neutralize acidic groups of the clay by forming insoluble silicate salts. Then after grinding of the dispersion 0.8 gram of $Al(NO_3)_3 \cdot 9H_2O$ was added followed by 1.0 grams of glacial acetic acid to adjust the pH to 4.5. The dispersed clay was indicated as having a strong positive charge by determination of streaming current. Polymerization was then carried out as in Example 1 with delayed addition of a solution of 4.5 grams of benzoyl peroxide in 324.0 grams of vinyl acetate. Care was required during addition of the monomer feed to prevent any accumulation of monomer which tended to cause large viscosity increases and coagulation at the point of contact of added monomer. However, by slow addition and adjustment of rotor speed as required the polymerization was completed without major difficulties. The product dispersion contained 56% total solids by weight, negligible residual monomer, had a pH of 4.3 and a viscosity of 6.0 poises (Brookfield, #3 spindle, 20 r.p.m. 20° C.). Electron micrographs showed very good deflocculation of the clay. The electron micrographs and microscopic examination using staining showed no emulsified polymer particles, thus indicating encapsulation of clay particles with retention of the particle shapes. The ratio of monomer to clay was 1.77 by weight giving a calculated polymer to clay volume ratio of 3.89.

EXAMPLE 9

This example illustrates polymer encapsulation of clay without the use of protective colloids and with prior charge reversal achieved by using acid and a cationic polyelectrolyte.

The procedure was carried out as described in Example 1, using the same apparatus but with a Type P7 disperser blade, suitable for high viscosity materials, operated at about 250 r.p.m. 366 grams of Clay SP33 was dispersed in 366 grams of water. After initial grinding of the dispersion, 5.0 grams of glacial acetic acid was added followed by 2.8 grams of a 50% by weight methanol solution of a dimethylaminoethyl methacrylate polymer. (The latter was prepared by polymerizing 2-dimethylaminoethyl methacrylate in methanol at reflux temperature using $\alpha$-$\alpha'$-azodiisobutyronitrile as initiator.) The dispersed clay was indicated to be cationically charged by streaming current measurements. Polymerization was then carried out using delayed addition of a solution of 0.7 gram α-α'-azodiisobutyronitrile and 3.0 grams t-butylaminoethyl methacrylate in 167 grams of vinyl acetate. The polymerization proceeded readily with occasional transient increases in viscosity. The product dispersion contained 59.0% by weight total solids, 0.43% residual monomer by weight of dispersion and had a pH of 3.4. Electron micrographs showed the clay to be well deflocculated and in conjunction with microscopic examination using staining indicated the absence of separate polymer particles. The monomer to clay ratio used was 0.47 by weight giving a calculated polymer to clay volume ratio of 1.

EXAMPLE 10

This example illustrates polymer encapsulation of clay with prior charge reversal achieved by using acid, an aluminum salt, and cationic polyelectrolyte.

The procedure was as described in Example 1. 366 grams of Clay SP33 was dispersed in 400 grams of water containing 6 grams of Natrosol 180LR hydroxyethyl cellulose. 0.4 gram of calcium hydroxide was added to neutralize acidic groups of the clay by forming insoluble silicates. Then after grinding of the dispersion 1.4 grams of $Al(NO_3)_3 \cdot 9H_2O$ was added followed by 3 grams of glacial acetic acid to adjust the pH to 4.5. Then 2 grams of 1% Colloid 5V protein solution was added. A decrease in dispersion viscosity indicated good deflocculation and the dispersed clay was indicated as being cationically charged. Polymerization was carried out using delayed addition of 1.7 grams of benzoyl peroxide in 169.5 grams vinyl acetate and, via a second dropping funnel, 330 grams of water. The product dispersion was soft settling and readily redispersed by stirring. It contained 40.8% total solids by weight, 1.22% residual monomer by weight, and had a pH of 3.9 and a viscosity of 35 poises (Brookfield, spindle #3, 20 r.p.m., 20° C.). The monomer to clay ratio used was about 0.47 by weight; the polymer to clay ratio was calculated to be 1 by volume. Electron micrographs showed excellent deflocculation of the clay and, in conjunction with microscopic examination using staining, indicated no separate dispersed polymer particles. Draw-downs of the dispersion on strips of Kraft paper could be heat sealed together at about 175° F. Drawdowns of dispersion samples on glass showed that when 5% hexylene glycol by weight of resin solids had been added to the dispersion as coalescing agent, the minimum film forming temperature was 14° C. These results taken in conjunction with the electron micrographs are further evidence of polymer encapsulation of the clay particles.

EXAMPLE 11

This example illustrates polymer encapsulation of a clay using a batch technique for the polymerization step rather than a delayed addition technique.

The apparatus used was as described in Example 1 except that a dropping funnel for slow addition of monomer feed solution during polymerization was not required. 366 grams of clay was dispersed by grinding in 366 grams of water to which had been added 4.0 grams of a vinyl pyrrolidone-vinyl acetate copolymer containing 60% by weight vinyl pyrrolidone sold as PVP/VA S-630 (trademark (by General Aniline and Film Corporation, and 2.4 grams $Al(NO_3)_3 \cdot 9H_2O$. The rotor speed was adjusted as required to maintain a deep vortex in the dispersion. Grinding was continued for about ten minutes after all the clay had been added. 5.0 grams of glacial acetic acid was then added with continued agitation, a strong reduction in slurry viscosity being observed as the acid was added indicating deflocculation of the clay. Then a solution of 0.7 gram α,α'-azodiisobutyronitrile and 3.0 grams of t-butylaminoethyl methacrylate in 167.0 grams of vinyl acetate was added and agitation continued until a good dispersion obtained. Polymerization was then carried out under a nitrogen blanket at 65° C. for one hour. The temperature was then gradually raised to 85° C. to reduce the residual monomer content and carry the polymerization to substantial completion. The polymerization proceeded smoothly without extreme fluctuations in viscosity. The product dispersion contained 58.4% total solids by weight, 0.07% residual monomer by weight, and had a pH of 3.7 and a viscosity of 3.5 poises (Brookfield, spindle #3, 20 r.p.m., 23° C.). The polymer to clay ratio was calculated to be about 1:1 by volume. The monomer to clay ratio used was about 0.47 by weight. Electron micrographs showed good deflocculation of the clay and, together with microscopic examination using staining, indicated the absence of dispersed polymer particles.

EXAMPLE 12

This example illustrates that after polymer encapsulation of, for example, clay has been carried out, controlled amounts of polymer emulsion can then be prepared directly in the aqueous dispersion by use of surfactant and additional monomer in quantities sufficient to form stable polymer emulsion.

(A) The procedure was as described in Example 1. 366 grams of Clay SP33 was dispersed in 366 grams of water containing 4.0 grams of PVP/VA S-630 copolymer and 2.4 grams $Al(NO_3)_3 \cdot 9H_2O$ dissolved therein. After the initial grinding, 5 grams glacial acetic acid was added and a large decrease in viscosity of the dispersion was noted. Then polymerization was carried out using delayed addition of a solution of 0.3 gram of α,α'-azodiisobutyronitrile and 1.5 grams t-butylaminoethyl methacrylate in 82 grams of vinyl acetate. After completion of addition of monomer and polymerization thereof, polymerization was continued in a second stage during which a solution, containing 0.3 gram of α,α'-azodiisobutyronitrile, 1.5 grams of t-butylaminoethyl methacrylate, 0.5 gram of a polyoxyethylene-polyoxypropylene copolymer emulsifier of approximate molecular weight 8750 containing about 80% by weight polyoxyethylene sold as "Pluronic F68" (trademark), and 0.5 gram of a polyoxyethylene-polyoxypropylene copolymer emulsifier of approximate molecular weight 2190 containing about 20% by weight polyoxyethylene sold as "Pluronic L62" (trademark) in 83 grams of vinyl acetate, was added by the same delayed addition technique. The polymerization was completed by gradual increase of temperature, after addition of all the monomer, to about 85° C. The product dispersion contained 58.3% total solids by weight of dispersion, 0.14% residual monober by weight of dispersion, and had a pH of 3.7 and a viscosity of 3.7 poises (Brookfield, spindle #3, 20 r.p.m., 26° C.). The overall monomer to clay ratio used was about 0.46 by weight. Electron micrographs showed good deflocculation of clay and in conjunction with microscopic examination using staining indicated no separate dispersed polymer particles. The quantity of the particular surfactant mixture added during the second stage of the polymerization was insufficient for formation of emulsified polymer and therefore only polymer encapsulation of the clay occurred.

(B) The procedure of Part A was repeated. 366 grams of clay SP33 was dispersed in 366 grams of water containing 2.0 grams of PVP/VA S-630 copolymer and 2.4 grams of $Al(NO_3)_3 \cdot 9H_2O$. 5 grams of glacial acetic acid was added after the initial grinding. For the first stage of the polymerization a solution of 0.3 gram α,α'-azodiisobutyronitrile and 1.5 grams t-butylaminoethyl methacrylate in 50 grams of vinyl acetate was added by delayed addition. During the second stage of the polymerization a solution of 0.3 gram α,α'-azodiisobutyronitrile, 7.0 grams Pluronic F68 surfactant and 7.0 grams Pluronic L62 surfactant in 117 grams of vinyl acetate was added. The product dispersion contained 58.4% total solids by weight of dispersion, negligible residual monomer, had a pH of 3.5 and a viscosity of 6.9 poises (Brookfield, spindle #3, 20 r.p.m., 27° C.). Electron micrographs showed good deflocculation of pigment and the presence of separate emulsified polymer particles as evidenced by their spherical shape, also indicated by microscopic examination using staining. The dispersion was found to have excellent film-forming properties and although it tended to settle within a relatively short period of time, the settled solids were very readily redispersed. The overall monomer to clay ratio used was 0.46 by weight and 0.14 for the first polymerization stage, giving a calculated volume ratio of encapsulating polymer to clay of about 0.3. Thus, after encapsulation has been carried out, polymerization can be continued to form any desired quantity of polymer emulsion using proper amounts of emulsifier for the particular vinylidene monomer used.

EXAMPLE 13

This example illustrates encapsulation of a clay with a copolymer according to the present invention.

The procedure described in Example 8 was followed. 355.0 grams of Clay SP33 was dispersed by grinding in 355 grams of water containing 4.0 grams of PVP/VA S–630 copolymer and 2.4 grams of $Al(NO_3)_3.9H_2O$. 5.0 grams of glacial acetic acid was then added with further grinding. The dispersed clay was indicated as having a strong positive charge by determination of streaming current. Polymerization was then carried out as in Example 1 with delayed addition of a solution containing 83.0 grams vinyl acetate, 83.0 grams 2-ethylhexyl acrylate, 3.0 grams t-butylaminoethyl methacrylate and 0.5 grams α-α'-azodiisobutyronitrile. The polymerization proceeded quite smoothly and the product dispersion was found to contain 57.9% total solids by weight of dispersion and 0.33% residual monomer by weight of dispersion. The pH of the dispersion was 3.7 and the viscosity 2.2 poises (Brookfield, spindle No. 3, 20 r.p.m., 25° C.). The dispersed solids settled quite rapidly but were readily redispersed merely by stirring. Electron micrographs showed good deflocculation of the clay and indicated the absence of spherical polymer particles. Thus polymer encapsulation of the clay particles was indicated, the encapsulating polymer retaining the shapes of the original clay particles. The monomer to clay ratio used was about 0.48 by weight.

EXAMPLE 14

This example illustrates encapsulation of an extender pigment with polyvinyl chloride and the use of the product in a composition suitable for extrusion.

To a 20 Imperial gallon (90.9 litres) glass-lined, jacketed, steel Pfaudler kettle, equipped with a 3-blade retreat curve impeller and a finger baffle, were added 45 kgm. of deionized water and 0.6 kgm. of 99.5% acetic acid. Stirring was started at ambient room temperature and 22.7 kgm. of an α-aluminum oxide trihydrate extender pigment, sold as Hydral 710 (trademark) by the Aluminum Co. of America, was added to the kettle in small increments with continued stirring. After addition of the pigment had been completed, a mineral spirits solution containing 4 grams of t-butyl peroxypivalate, sold as Lupersol 11 (trademark) by Lucidol Division of Wallace & Tiernan Inc., and an aqueous slurry containing 2 grams of acetylcyclohexane sulfonyl peroxide, sold as Luperox 228 (trademark) by Lucidol, were added. Stirring was discontinued and the air evacuated from the sealed kettle by means of a single stage steam ejector. 20 minutes after evacuation of the air, 10 kgm. of vinyl chloride was charged to the kettle and stirring restarted at 180 r.p.m. The temperature of the charge was raised to 58° C. and maintained at this level for the duration of the polymerization. At the start of the reaction the pressure in the kettle was 120 p.s.i. which dropped gradually to 105 p.s.i. over a period of 8 hours and then to 94 p.s.i. over the following hour. The reaction was then terminated by blowing off the residual monomer. The pH of the charge after reatcion was 4.0 and the reaction product was in the form of a heavy paste. The ratio of monomer to pigment used for the polymerization was 0.44. Electron micrographs indicated the absence of free polymer particles and hence encapsulation of pigment.

Solids were recovered from the product paste by drying at 54° C. The product solids were tested in an extrusion resin composition containing about 20% by weight pigment. Improved surface properties i.e. smoothness and gloss, and greater heat stability were found as compared to a composition containing the same proportions of ingredients but using non-encapsulated pigment.

In addition to the materials illustrated in the foregoing examples other finely divided inorganic solids, for instance a natural calcium carbonate mineral, have also been encapsulated with polymer according to the process of the present invention. Numerous other modifications of the various expedients described can also be made without department from the scope of the invention which is defined in the following claims.

What is claimed is:

1. A process for encapsulation by deposition of polymer on particles of a finely divided inorganic solid material dispersed in an aqueous medium which comprises:
    (a) establishing a cationic charge on the inorganic solid material dispersed in the aqueous medium by adjustment of the pH of the aqueous medium to less than 7 and adsorption of multivalent inorganic aluminum cations on the inorganic solid by incorporating in the aqueous medium aluminum compound capable of forming aluminum cations under acidic conditions and acid in quantity sufficient to decrease the viscosity of the dispersion of the inorganic solid in the aqueous medium to a minimum,
    (b) adding to the aqueous medium vinylidene monomer which is polymerizable to form water-insoluble polymer and polymerizing said monomer in the presence of the dispersed inorganic solid with agitation and the aid of a free radical producing polymerization initiator, the weight ratio of total monomer to dispersed solid being not greater than about 2.5 to 1 and the proportion of any emulsifying agent for said monomer being insufficient to cause formation during polymerization of emulsified polymer particles separate from the dispersed solid.

2. A process as claimed in claim 1 wherein no emulsifying agent for the monomer is employed.

3. A process as claimed in claim 2 wherein the inorganic material is a pigment or clay.

4. A process as claimed in claim 3 wherein the proportion of monomer relative to dispersed solid is less than about 1 by weight.

5. A process as claimed in claim 1 wherein the monomer comprises vinyl acetate.

6. A process as claimed in claim 1 wherein the monomer comprises vinyl chloride.

7. A process as claimed in claim 1 wherein the cationic charge is supplemented by adjustment of the pH of the aqueous medium to less than 7 and absorption on the dispersed inorganic solid of an organic compound which is cationic at said pH.

8. A process as claimed in claim 7 wherein the organic compound is a polyelectrolyte.

9. A process as claimed in claim 1 wherein the cationic charge is established by adjustment of the pH of the aqueous medium to less than 7 and absorption on the dispersed inorganic solid of a multivalent inorganic cation and an organic compound which is cationic at said pH.

10. A process as claimed in claim 2 wherein the monomer is used in proportions which are soluble in the aqueous medium and the free radical producing polymerization initiator is water soluble.

11. A process as claimed in claim 10 wherein the monomer is vinyl acetate and the initiator is a persulfate salt.

12. A process as claimed in claim 1 wherein the monomer is used in proportions which form a separate liquid phase with the aqueous medium and the free radical producing polymerization initiator is a member of the group consisting of benzoyl peroxide, α,α'-azodiisobutyronitrile, and the combination of acetyl cyclohexane sulfonyl peroxide and t-butyl peroxy pivalate.

13. A process as claimed in claim 1 which includes the additional steps of (c) adding, after completion of said polymerization, additional monomer and emulsifying agent for said monomer and (d) polymerizing the additional monomer in the aqueous medium to form emulsified polymer therein.

References Cited

UNITED STATES PATENTS

| | | | |
|---|---|---|---|
| 3,519,594 | 7/1970 | Michaels | 260—29.6 RU |
| 3,532,662 | 10/1970 | Ansdell | 260—29.6 R |
| 3,544,500 | 12/1970 | Osmond et al. | 252—316 |

HAROLD D. ANDERSON, Primary Examiner

U.S. Cl. X.R.

252—316; 260—8, 17 A, 17.4 ST, 23 R, 29.6 RW, 29.6 T